(12) United States Patent
Nachnani et al.

(10) Patent No.: US 9,495,403 B2
(45) Date of Patent: Nov. 15, 2016

(54) METHOD AND SYSTEM FOR CLEANING DATA IN A CUSTOMER RELATIONSHIP MANAGEMENT SYSTEM

(71) Applicant: salesforce.com, inc., San Francisco, CA (US)

(72) Inventors: Pawan Nachnani, Newark, CA (US); Dan Milbrath, San Francisco, CA (US); Susan Levine, Walnut Creek, CA (US); Eli Levine, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/773,383

(22) Filed: Feb. 21, 2013

(65) Prior Publication Data
US 2014/0081908 A1 Mar. 20, 2014

Related U.S. Application Data

(60) Provisional application No. 61/701,428, filed on Sep. 14, 2012.

(51) Int. Cl.
*G06F 17/00* (2006.01)
*G06F 17/30* (2006.01)

(52) U.S. Cl.
CPC ... *G06F 17/30345* (2013.01); *G06F 17/30303* (2013.01)

(58) Field of Classification Search
CPC .............. G06F 17/30345; G06F 17/30303
USPC ............................................. 707/609
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

OTHER PUBLICATIONS

Chiu, Dickson K. W., et al., "An Event Driven Approach to Customer Relationship Management in e-Brokerage Industry", HICSS 2003, IEEE Computer Society, Jan. 6-9, 2003, 10 pages.*

(Continued)

*Primary Examiner* — Robert Stevens
(74) *Attorney, Agent, or Firm* — Dergosits & Noah LLP; Todd A. Noah

(57) ABSTRACT

Systems and methods are provided for cleaning data in a customer relationship management system. A system receives a plurality of records from an on-demand system. The system identifies a record from the plurality of records that matches a stored record for a customer relationship management system. The system determines whether to update the stored record using the identified record. The system updates the stored record using the identified record in response to a determination to update the stored record using the identified record.

16 Claims, 7 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,219,648 B1* | 4/2001 | Jones et al. .................. 705/7.39 |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1* | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1* | 1/2005 | Warner et al. |
| 6,850,895 B2 | 2/2005 | Brodersen et al. |
| 6,850,949 B2 | 2/2005 | Warner et al. |
| 6,865,268 B1* | 3/2005 | Matthews et al. ....... 379/265.09 |
| 7,062,502 B1 | 6/2006 | Kesler |
| 7,069,497 B1 | 6/2006 | Desai |
| 7,340,411 B2* | 3/2008 | Cook ........................... 705/7.13 |
| 7,356,482 B2 | 4/2008 | Frankland et al. |
| 7,376,680 B1* | 5/2008 | Kettler et al. |
| 7,401,094 B1 | 7/2008 | Kesler |
| 7,529,728 B2* | 5/2009 | Weissman et al. |
| 7,580,850 B2* | 8/2009 | Lurie ........................... 705/7.26 |
| 7,603,483 B2 | 10/2009 | Psounis et al. |
| 7,620,655 B2 | 11/2009 | Larsson |
| 7,698,160 B2 | 4/2010 | Beaven et al. |
| 7,708,202 B2* | 5/2010 | Hawkins ....................... 235/385 |
| 7,730,478 B2* | 6/2010 | Weissman ..................... 717/171 |
| 7,770,039 B2* | 8/2010 | DuBose ......................... 713/300 |
| 7,779,039 B2* | 8/2010 | Weissman ......... G06F 17/30595<br>707/793 |
| 7,779,475 B2 | 8/2010 | Jakobson et al. |
| 7,814,052 B2* | 10/2010 | Bezar et al. .................. 707/610 |
| 7,827,138 B2* | 11/2010 | Salmon et al. ............... 707/610 |
| 7,851,004 B2 | 12/2010 | Hirao et al. |
| 7,930,314 B2* | 4/2011 | Gupta ............... G06F 17/30389<br>707/737 |
| 7,933,587 B1* | 4/2011 | Swan ........................ 455/412.1 |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,200,705 B2* | 6/2012 | Wang et al. .................. 707/796 |
| 8,209,308 B2 | 6/2012 | Jakobson et al. |
| 8,224,830 B2* | 7/2012 | Bidlack ........................ 707/758 |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0133392 A1* | 9/2002 | Angel et al. ..................... 705/10 |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0198775 A1* | 12/2002 | Ryan ............................... 705/14 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0107189 A1* | 6/2004 | Burdick et al. ..................... 707/3 |
| 2004/0107203 A1* | 6/2004 | Burdick et al. ................ 707/101 |
| 2004/0128001 A1 | 7/2004 | Levin et al. |
| 2004/0179672 A1* | 9/2004 | Pagel et al. ................. 379/266.1 |
| 2004/0181512 A1* | 9/2004 | Burdick et al. ..................... 707/3 |
| 2004/0186860 A1* | 9/2004 | Lee et al. ...................... 707/200 |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0108041 A1* | 5/2005 | White ............................... 705/1 |
| 2005/0283753 A1* | 12/2005 | Ho et al. ........................ 717/102 |
| 2006/0004869 A1* | 1/2006 | Yuster et al. ............... 707/104.1 |
| 2007/0078950 A1* | 4/2007 | Hopkins et al. ............. 709/217 |
| 2007/0088741 A1* | 4/2007 | Brooks et al. ............ 707/103 R |
| 2007/0130130 A1* | 6/2007 | Chan et al. ........................ 707/3 |
| 2007/0130137 A1* | 6/2007 | Oliver et al. ....................... 707/5 |
| 2008/0126333 A1* | 5/2008 | Bezar et al. ....................... 707/5 |
| 2008/0162509 A1* | 7/2008 | Becker ............. G06F 17/30377 |
| 2008/0162544 A1* | 7/2008 | Weissman et al. ....... 707/103 R |
| 2009/0063415 A1 | 3/2009 | Chatfield et al. |
| 2009/0083652 A1* | 3/2009 | Krasner et al. ............... 715/772 |
| 2009/0100342 A1 | 4/2009 | Jakobson |
| 2009/0177744 A1 | 7/2009 | Marlow et al. |

(56) References Cited

U.S. PATENT DOCUMENTS

| | | | |
|---|---|---|---|
| 2009/0299811 A1* | 12/2009 | Verfuerth et al. | 705/9 |
| 2010/0030995 A1* | 2/2010 | Wang et al. | 711/173 |
| 2010/0063959 A1* | 3/2010 | Doshi et al. | 707/618 |
| 2010/0121923 A1* | 5/2010 | Cvetkovic | G06Q 10/06 709/206 |
| 2010/0179860 A1* | 7/2010 | Noel et al. | 705/10 |
| 2010/0192067 A1* | 7/2010 | Casalaina | 715/742 |
| 2010/0223100 A1* | 9/2010 | Lee | G06Q 10/063 705/7.11 |
| 2010/0223284 A1* | 9/2010 | Brooks et al. | 707/769 |
| 2010/0232585 A1* | 9/2010 | Lyman | 379/112.01 |
| 2010/0235322 A1* | 9/2010 | Kuruganti | G06F 17/30575 707/610 |
| 2010/0235495 A1* | 9/2010 | Petersen et al. | 709/224 |
| 2010/0250565 A1* | 9/2010 | Tobin et al. | 707/756 |
| 2010/0299663 A1* | 11/2010 | Weissman et al. | 717/170 |
| 2010/0299664 A1* | 11/2010 | Taylor | G06F 17/30377 717/173 |
| 2010/0332447 A1* | 12/2010 | Bezar et al. | 707/610 |
| 2011/0082864 A1* | 4/2011 | Banister | G06F 17/30563 707/741 |
| 2011/0082890 A1* | 4/2011 | Banister | G06F 17/30563 707/792 |
| 2011/0099042 A1* | 4/2011 | Yerkes | 705/7.19 |
| 2011/0113057 A1* | 5/2011 | Lee | G06Q 10/10 707/769 |
| 2011/0113071 A1* | 5/2011 | Lee et al. | 707/802 |
| 2011/0113072 A1* | 5/2011 | Lee et al. | 707/802 |
| 2011/0137940 A1* | 6/2011 | Gradin et al. | 707/769 |
| 2011/0145805 A1* | 6/2011 | Taylor et al. | 717/168 |
| 2011/0209094 A1* | 8/2011 | Gasn et al. | 715/843 |
| 2011/0225185 A1* | 9/2011 | Gupta | G06F 17/30067 707/769 |
| 2011/0225217 A1* | 9/2011 | Plax | G06F 17/3056 707/825 |
| 2011/0225500 A1* | 9/2011 | Casalaina et al. | 715/738 |
| 2011/0225506 A1* | 9/2011 | Casalaina et al. | 715/741 |
| 2011/0238622 A1* | 9/2011 | Walters | G06F 17/30578 707/610 |
| 2011/0238705 A1* | 9/2011 | Baker | G06F 17/30607 707/802 |
| 2011/0246449 A1* | 10/2011 | Collins et al. | 707/715 |
| 2011/0282907 A1* | 11/2011 | Ramsey et al. | 707/783 |
| 2011/0283224 A1* | 11/2011 | Ramsey et al. | 715/781 |
| 2011/0295910 A1* | 12/2011 | Ziemann et al. | 707/803 |
| 2011/0302221 A1* | 12/2011 | Tobin et al. | 707/805 |
| 2011/0307695 A1* | 12/2011 | Slater | 713/163 |
| 2012/0016621 A1* | 1/2012 | Tan et al. | 702/122 |
| 2012/0023107 A1* | 1/2012 | Nachnani et al. | 707/748 |
| 2012/0059795 A1* | 3/2012 | Hersh et al. | 707/628 |
| 2012/0072464 A1* | 3/2012 | Cohen | 707/803 |
| 2012/0086544 A1* | 4/2012 | Kemp | 340/5.1 |
| 2012/0089562 A1* | 4/2012 | Deremigio | G06F 17/30563 707/602 |
| 2012/0101985 A1* | 4/2012 | Kemp et al. | 707/609 |
| 2012/0109887 A1* | 5/2012 | Ziemann et al. | 707/610 |
| 2012/0143819 A1* | 6/2012 | Tan | G06F 17/30575 707/626 |
| 2012/0233137 A1 | 9/2012 | Jakobson et al. | |
| 2012/0259894 A1* | 10/2012 | Varley | G06F 17/30575 707/795 |
| 2013/0110565 A1* | 5/2013 | Means et al. | 705/7.11 |
| 2013/0117228 A1* | 5/2013 | Appleman | G06F 17/30578 707/626 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0290690 A1* | 10/2013 | Nucci | G06F 17/30126 713/1 |
| 2014/0052695 A1* | 2/2014 | Cohen et al. | 707/691 |

OTHER PUBLICATIONS

Cunningham, Colleen, et al., "Data Warehouse Design to Support Customer Relationship Management Analyses", Dolap '04, Washington, DC, Nov. 12-13, 2004, pp. 14-22.*

Shanks, Graeme, et al., "A Framework for Understanding Customer Relationship Management Systems Benefits", Communications of the Association for Information Systems, vol. 25, Article 26, Sep. 2009, 28 pages.*

Hai, Henry, et al., "SaaS and Integration Best Practices", FUJITSU Sci. Tech. J., vol. 45, No. 3, Jul. 2009, pp. 257-264.*

Microsoft Computer Dictionary, 5th Edition, Microsoft Press, Redmond, WA, © 2002, pp. 351, 385 and 513.*

Weissman, Craig D., et al., "The Design of the Force.com Multitenant Internet Application Development Platform", SIGMOD '09, Providence, RI, Jun. 29-Jul. 2, 2009, pp. 889-896.*

Pippal, Sanjeev, et al., "An Efficient Schema Shared Approach for Cloud based Multitenant Database with Authentication & Authorization Framework", 3PGCIC 2011, Barcelona, Spain, Oct. 26-28, 2011, pp. 213-218.*

Jacobs, Dean, et al., "Ruminations on Multi-Tenant Databases", BTW 2007, Aachen, Germany, Mar. 2007, 8 pages.*

Pippal, Sanjeev, et al., "Secure and Efficeint Multitenant Database for an Ad hoc Cloud", IWSSC 2011, Milan, Italy, Sep. 5-8, 2011, pp. 46-50.*

Fang, Shaoquan, et al., "A Comparison of Multi-Tenant Data Storage Solutions for a Software-as-a-Service", ICCSE 2011, Singapore, Aug. 3-5, 2011, pp. 95-98.*

Peterson, Zachary, et al., "Ext3cow: A Time-Shifting System for Regulatory Compliance", ACM Transactions on Storage, vol. 1, No. 2, May 2005, pp. 190-212.*

Microsoft Computer Dictionary, 5th Edition, Microsoft Press, Redmond, WA, © 2002, pp. 442-443.*

Rao, G. Siva Nageswara, et al., "Removing Inconsistensies and Errors from Original Data Sets through Data Cleansing", IJETAE, vol. 2, Issue 3, Mar. 2012, pp. 112-115.*

Faruquie, Tanveer A., et al., "Data Cleansing as a Transient Service", ICDE 2010, Long Beach, CA Mar. 1-6, 2010, pp. 1025-1036.*

Talburt, John, et al., "Customer-Centric InformationQuality Management", CCIQM Work Group ACXIOM Corp., MITIQ Management Program and Cambridge Research Group, May 24, 2004, pp. 1-9.*

"Oracle Customer Hub", Oracle Data Sheet, Copyright © 2007, Oracle Corp., pp. 1-13.*

U.S. Appl. No. 13/998,890.
U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

210

| Clean Account with Data.com | | | ✖ |
|---|---|---|---|
| | Salesforce | d Data.com | ⓘ —212 |
| | | Select All \| Clear All \| Show Identical Fields | |
| Account Name | Apple Inc | ✓ Apple Inc | |
| D&B Company Record Linked | | ☐ Apple Inc (D-U-N-S # *****4780) | 214 |
| Employees | 40,000 | ☐ 60,400 | |
| Annual Revenue | $65,225,000,000 | ☐ $108,249,000,000 | |
| D-U-N-S- Number | | ☐ *****4780 | |
| Tradestyle | | ☐ Apple | |
| SIC Code | | ☐ 3863 | 216 |
| SIC Description | | ☐ Radio and T.v. Communications Equipment | |
| NAICS Code | | ☐ 334220 | |
| NAICS Description | | ☐ Radio and Ttelevision Broadcasting and Wireless | |
| | Save | Cancel | |

| | | 230 | |
|---|---|---|---|
| | | ↙ | |

| Accounts with Clean Status ⇕ | Edit \| Delete \| Create New View | | |
|---|---|---|---|
| New Account ⟲ | | A\|B\|C\|D\|E\|F\|G\|H\|I\|J\|K\|L\|M\|N\|O\|P\|Q\|R\|S\|T\| | ←234 |
| ☐ Action | Account Name ―232 | D-U-N-S Number | Clean Status |
| ☐ Edit \| Del \| ○ | Acme | | ⊘ Not Found |
| ☐ Edit \| Del \| ○ | Aegeon USA Investment Management LLC | 623190410 | ⊗ Different |
| ☐ Edit \| Del \| ✓ | Apple Inc | | ⊗ Different |
| ☐ Edit \| Del \| ○ | Berkshire Hathaway Inc | 001024314 | ⊘ In Sync |
| ☐ Edit \| Del \| ○ | BLUE CROSS BLUE SHIELD OF KC | | ⊘ Inactive |
| ☐ Edit \| Del \| ○ | Cisco Systems Inc | 153804570 | ⊘ Not Found |
| ☐ Edit \| Del \| ○ | Cisco Systems Inc | 153804570 | ⊘ Not Found |
| ☐ Edit \| Del \| ○ | Dell Inc | 114315195 | ⊘ Reviewed |

FIG. 2D

METHOD AND SYSTEM FOR CLEANING DATA IN A CUSTOMER RELATIONSHIP MANAGEMENT SYSTEM

CLAIM OF PRIORITY

This application claims the benefit of U.S. Provisional Patent Application 61/701,428 entitled SYSTEM AND METHOD FOR CLEANING DATA IN AN ON-DEMAND SYSTEM, by Pawan Nachnani, et al., filed Sep. 14, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PROVIDING POSITION ABLE DYNAMIC CONTENT

One or more implementations relate generally to providing users with clean data. More particularly, it relates to providing clean, complete and accurate business data to business entities.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Used mainly in databases, data cleaning is the process of identifying incomplete and/or incorrect parts of the data and then replacing, modifying, or deleting this "dirty" data. The actual process of data cleaning may involve removing typographical errors or validating and correcting values against a known list of entities. The validation may be strict, such as rejecting any address that does not have a valid postal code, or fuzzy, such as correcting records that partially match existing, known records. Some data cleaning solutions will clean data by cross checking with a validated data set. Data enhancement, where data is made more complete by adding related information, is a common data cleaning practice, such as appending addresses with phone numbers related to that address. In the business world, incorrect data can be costly. Many companies use customer information databases that record data like contact information, addresses, and preferences. For instance, if customer addresses are inconsistent, the company will suffer the cost of resending mail or even losing customers. Much of an average company's customer contact data goes bad annually. Accordingly, it is desirable to provide techniques that enable a database system to clean data in a customer relationship management system.

BRIEF SUMMARY

In accordance with embodiments, there are provided systems and methods for cleaning data in a customer relationship management system. A system receives multiple records from an on-demand system. For example, a customer relationship management system receives records for Apple® Inc. from an on-demand system. The system identifies a record from the multiple records as matching a record stored for a customer relationship management system. For example, the customer relationship management system identifies employee records for Apple® Inc. from the on-demand system that match the employee records stored for Apple® Inc. in the customer relationship management system. The system determines whether to update the stored record using the identified record. For example, the customer relationship management system sends a matching record alert to a system user, receives a user request to view a comparison of matching records, displays a comparison of the matching records to the user, and enables the user to select which customer relationship management records to update using the records received from the on-demand system. In another example, if an administrator for the customer relationship management system selects a blank auto-fill default option, the customer relationship management system automatically updates a blank record stored in the customer relationship management system using a record received from the on-demand system. The system updates the stored record using the identified record. For example, the customer relationship management system updates the employee records stored for Apple® Inc. in the customer relationship management system that differ from the records received for Apple® Inc. from the on-demand system. Accordingly, systems and methods are provided which enable a system to clean data in a customer relationship management system.

While one or more implementations and techniques are described with reference to an embodiment in which cleaning data in a customer relationship management system is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2B is a screen shot illustrating a frame of another example user interface screen of a display device supporting methods for cleaning data in a customer relationship management system;

FIG. 2C is a screen shot illustrating a frame of yet another example user interface screen of a display device supporting methods for cleaning data in a customer relationship management system;

FIG. 2D is a screen shot illustrating a frame of a further example user interface screen of a display device supporting methods for cleaning data in a customer relationship management system;

DETAILED DESCRIPTION

General Overview

Systems and methods are provided for cleaning data in a customer relationship management system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for cleaning data in a customer relationship management system will be described with reference to example embodiments.

The following detailed description will first describe a method for cleaning data in a customer relationship management system.

Next, screen shots illustrating frames of example user interface screens are described.

Figure 1:
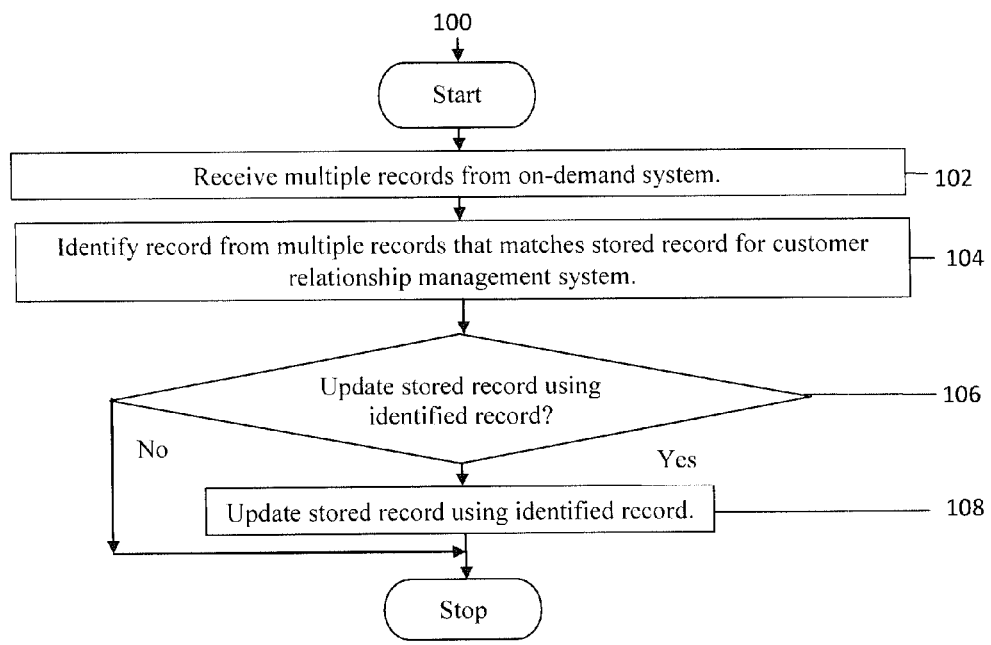
FIG. 1 is an operational flow diagram illustrating a high level overview of a method for cleaning data in a customer relationship management system in an embodiment.

FIG. 1 is an operational flow diagram illustrating a high level overview of a method 100 for cleaning data in a customer relationship management system in an embodiment. As shown in FIG. 1, a database system can clean data in a customer relationship management system.

In block 102, multiple records are received from an on-demand system. For example and without limitation, this can include the database system receiving business records for many different business entities from the on-demand system Data.com®.

In block 104, a record from the multiple records is identified as matching a record stored for a customer relationship management system. By way of example and without limitation, this can include the database system identifying employee records for Apple® Inc. from Data.com® that match the employee records stored for Apple® Inc. in the customer relationship management system provided by Salesfore.com®.

In block 106, a determination is made whether to update the stored record using the identified record. In embodiments, this may include the database system sending a matching record alert to a system user, receiving a user request to view a comparison of matching records, displaying a comparison of the matching records to the user, and enabling the user to select which customer relationship management records to update using the records received from the on-demand system. If an administrator for the customer relationship management system selects a blank auto-fill default option, the database system may also automatically update a blank record stored in the customer relationship management system using a record received from the on-demand system. If a determination is made to update the stored record using the identified record, the method 100 continues to block 108. If a determination is made to not update the stored record using the identified record, the method 100 terminates.

In block 108, the stored record is updated using the identified record. For example and without limitation, the database system updates the employee records stored for Apple® Inc. in the customer relationship management system provided by Salesfore.com® that differ from the records received for Apple® Inc. from Data.com®. In another example, the database system updates the blank employee records stored for Apple® Inc. in the customer relationship management system provided by Salesfore.com® with the records received for Apple® Inc. from Data.com®.

The method 100 may be repeated as desired. Although this disclosure describes the blocks 102-108 executing in a particular order, the blocks 102-108 may be executed in a different order.

Figure 2A:
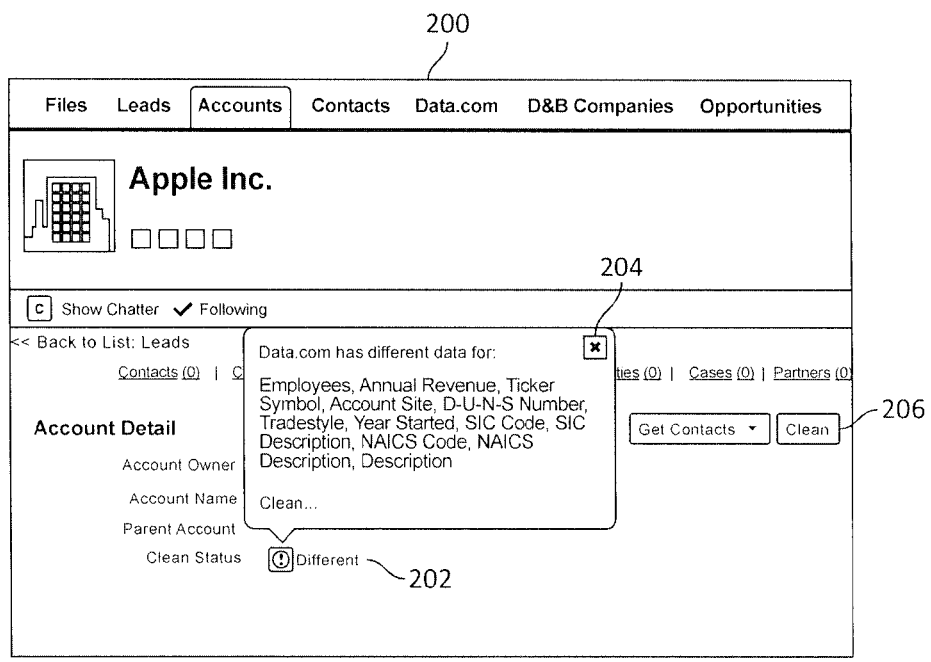
FIG. 2A is a screen shot illustrating a frame of an example user interface screen of a display device supporting methods for cleaning data in a customer relationship management system.

FIG. 2A is a screen shot illustrating a frame 200 of an example user interface screen of a display device for cleaning data in a customer relationship management system. The frame 200 may be displayed by a customer relationship management system, such as Salesforce.com®, which is an on-demand system to which a business entity can subscribe to manage the business entity's relationships with the business entity's customers. The frame 200 includes information associated with a contact, a lead, opportunity, and/or an account, such as an account with Apple® Inc. The frame 200 also includes a clean status 202, an identified records list 204, and a clean data option 206. Although FIG. 2A depicts the clean status 202, the identified records list 204, and the clean data option 206 for the frame 200 that displays account information, other frames that display lead information, opportunity information, and/or contact information may also include the clean status 202, the identified records list 204, and the clean data option 206. The clean status 202, which may be a matching record alert, displays "different" to indicate that a database system has identified records received from an on-demand system that differ from matching records stored in a customer relationship management system. The clean status 202 displays "reviewed" to indicate that another user previously responded to a matching records alert for the identified records. A matching records alert may also communicate with users of the customer relationship management system by other means, such as by emails or text messages. The identified records list 204 may list at least some of the identified records received from an on-demand system that differ from matching records stored in a customer relationship management system, such as "employees" and "annual revenue." The identified records list 204 may also list at least some of the identified records that another user reviewed but did not use to update the stored records, such as a phone number that the other user knew was outdated in the identified records but already correct in the stored records. The clean data option 206 enables a user to prompt a database system to display a comparison frame for records received from an on-demand system and matching records stored in a customer relationship management system. An example of such a comparison frame is described below in reference to FIG. 2B.

FIG. 2B is a screen shot illustrating a frame 210 of another example user interface screen of a display device for cleaning data in a customer relationship management system. The frame 210 displays a side-by-side comparison of records received from an on-demand system and matching records stored in a customer relationship management system. The frame 210 includes an identical fields option 212, and selection checkboxes 214-216. The identical fields option 212 enables a user to select whether to show or hide the comparisons of identical records, thereby enabling the user to focus only on the differences between records received from an on-demand system and matching records stored in a customer relationship management system, such as such as "employees" and "annual revenue." The selection checkbox 214 enables a user to select to update the matching record stored in the customer relationship management system using the identified record received from the on-demand system, such as "annual revenue." The selection checkbox 216 enables a user to select to fill in a blank record in the customer relationship management system using the matching identified record received from the on-demand system, such as "description."

Figure 2C:
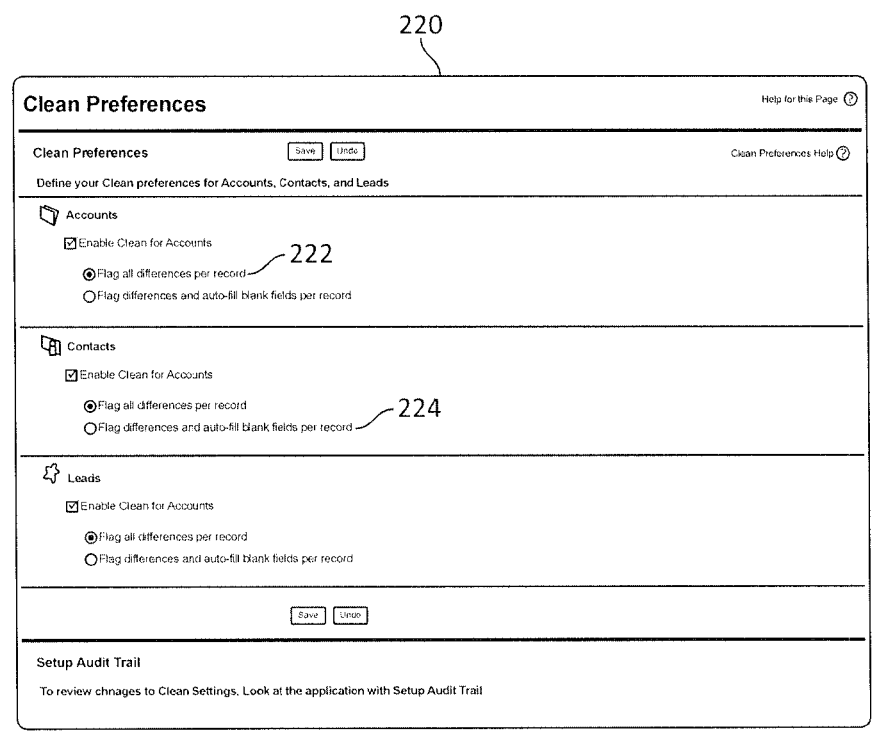

FIG. 2C is a screen shot illustrating a frame 220 of yet another example user interface screen of a display device for cleaning data in a customer relationship management system. The frame 220 includes a flag differences option 222 and a fill blank fields option 224. The flag differences option 222 enables an administrator of the customer relationship management system to select to update the clean status 202 of FIG. 2A for users of the customer relationship management system. The fill blank fields option 224 enables an administrator of the customer relationship management system to select a blank auto-fill default to automatically update blank records stored in the customer relationship management system using the matching identified records, such as blank records for accounts, contacts, opportunities, and/or leads. The database system may create an audit trail to track the changes made by administrators via the frame 220.

FIG. 2D is a screen shot illustrating a frame 230 of a further example user interface screen of a display device for cleaning data in a customer relationship management system. The frame 230 includes an account 232 column and a clean status column 234. The account column 232 enables an administrator of the customer relationship management system to review all of the customers with whom the administrator's business entity has an existing or potential relationship. The clean status column 234 enables an administrator of the customer relationship management system to review the clean status 202 for the FIG. 2A for each account. The clean status column 234 may indicate whether the customer relationship management system received differing records for an account, is synchronized between its stored records and the records received from the on-demand system, or whether the most recent receipt of records from the on-demand system did not include records for a customer. An administrator of the customer relationship management system may schedule the receipt of records from the on-demand system, which may be based on the license that the administrator's business entity has with the on-demand system. A business entity may purchase a license to enable all of the users of the business entity's customer relationship management system to access and use the records received from the on-demand system, or the business entity may purchase a license to enable selected users of the business entity's customer relationship management system to access and use records received from the on-demand system. The database system may also compile dashboards and reports on the identified records from an on-demand system that match stored records for a customer relationship management system, such as the percentage of records that matched, the percentage or records that were automatically updated, and the percentage of records that were updated based on user selections.

The frames 200, 210, 220, and 230 may be part of a larger display screen that includes fields for users to enter commands to create, retrieve, edit, and store records. The database system may output a display screen that includes the frames 200, 210, 220, and 230 in response to a search based on search criteria input via a user interface. Because the frames 200, 210, 220, and 230 are samples, the frames 200, 210, 220, and 230 could vary greatly in appearance. For example, the relative sizes and positioning of the text is not important to the practice of the present disclosure. The frames 200, 210, 220, and 230 can be depicted by any visual display, but are preferably depicted by a computer screen. The frames 200, 210, 220, and 230 could also be output as a report and printed or saved in electronic format, such as PDF. The frames 200, 210, 220, and 230 can be part of a personal computer system and/or a network, and operated from system data received by the network, and/or on the Internet. The frames 200, 210, 220, and 230 may be navigable by a user. Typically, a user can employ a touch screen input or a mouse input device to point-and-click to a location on the frames 200, 210, 220, and 230 to manage the text on the frame 200, 210, 220, and 230, such as a selection that enables a user to edit the text. Alternately, a user can employ directional indicators, or other input devices such as a keyboard. The text depicted by the frames 200, 210, 220, and 230 are examples, as the frames 200, 210, 220, and 230 may include a much greater amount of text. The frames 200, 210, 220, and 230 may also include fields in which a user can input textual information.

System Overview

Figure 3:
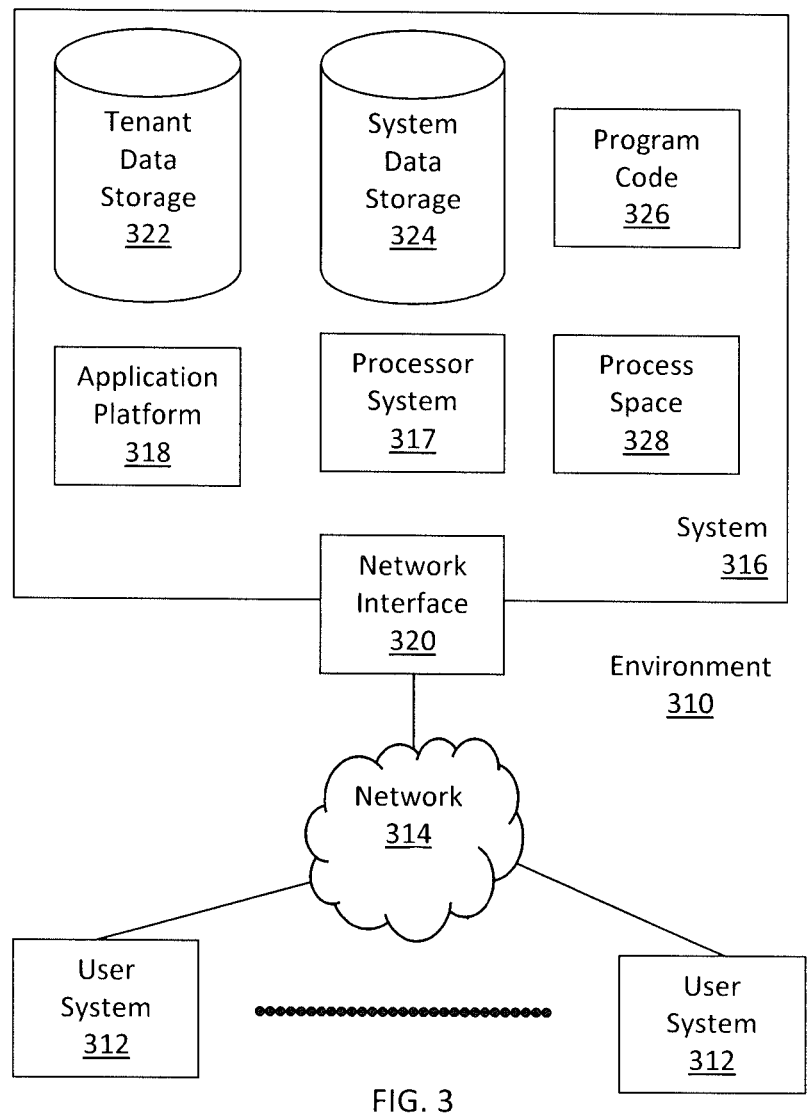
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 4:
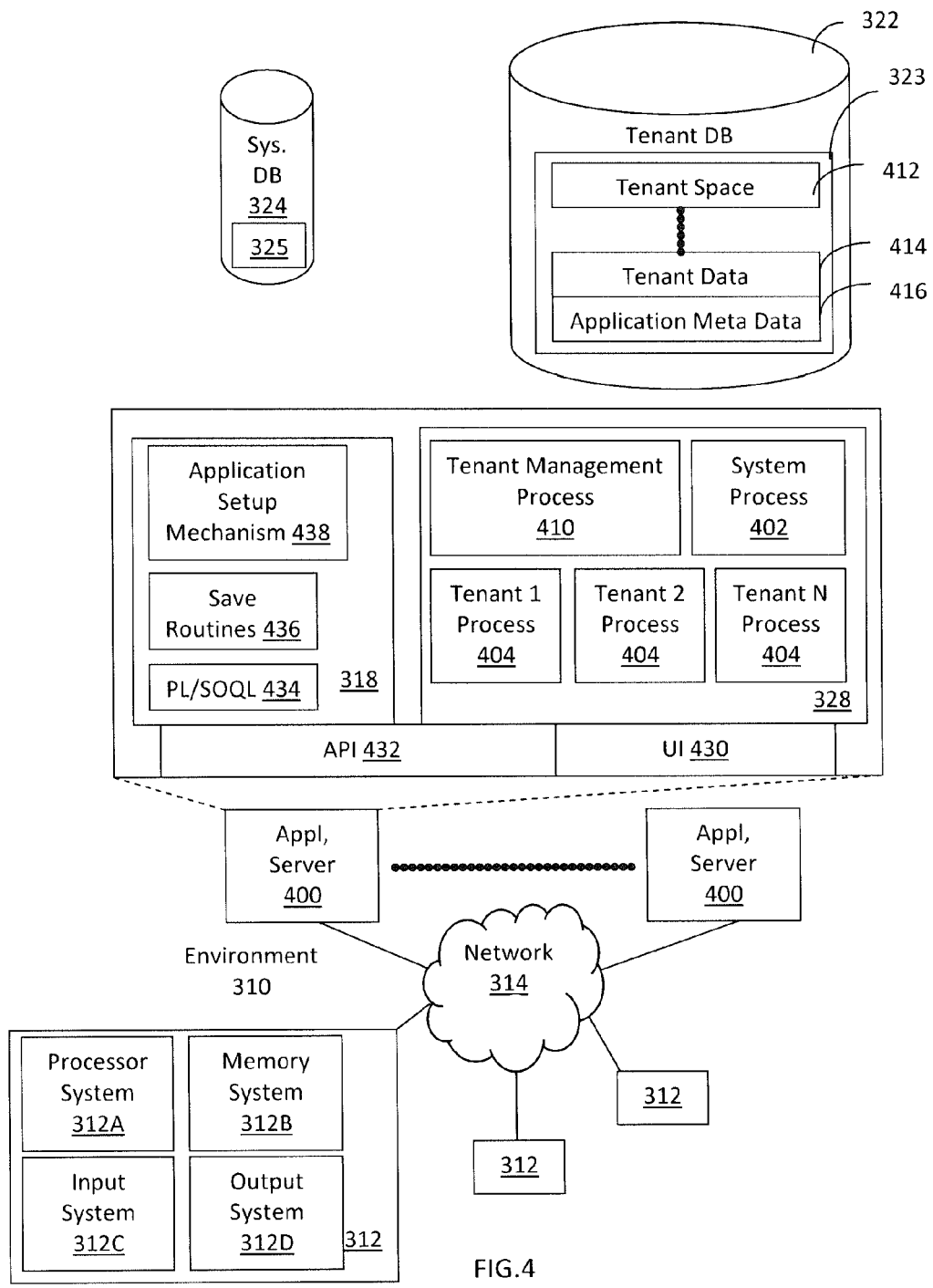
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server 400$_1$ might be coupled via the network 314 (e.g., the Internet), another application server 400$_{N-1}$ might be coupled via a direct network link, and another application server 400$_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for cleaning data in a customer relationship management system, the apparatus comprising:
a processor; and
a non-transitory computer readable medium storing a plurality of instructions, which when executed, cause the one or more processors to:
receive a plurality of records;
compare the plurality of records to stored records in a database of a customer relationship management system, the plurality of records being stored in a datastore that is independent of the database of the customer relationship management system;
identify a record from the plurality of records based on the identified record having content in a first data field that matches content in a corresponding first data field in a stored record in the database of the customer relationship management system, the identified record further comprising content in a second data field that differs from content in a corresponding second data field in the stored record, the first and second fields of the identified record being different; and
update the content in the second data field in the stored record using the content in the second data field in the identified record in response to a determination to update the content in the second data field in the stored record using the content in the second data field in the identified record, the determination being made in response to either a user request or automatically based on a previously selected blank auto-fill default.

2. The apparatus of claim 1, wherein identifying the record is based on a business entity associated with the stored record and the identified record, and wherein the identified record is associated with at least one of a contact, a lead, an opportunity, and an account.

3. The apparatus of claim 1, wherein the receipt of the selection to update the content in the corresponding second data field in the stored record using the content in the second data field in the identified record is based on displaying a comparison of the identified record and the stored record via a user interface and receiving a selection to update the content in the corresponding second data field in the stored record using the content in the second data in the identified record via the user interface in response to displaying the comparison.

4. The apparatus of claim 3, wherein displaying the comparison is further based on receiving a request to display the comparison via the user interface, wherein receiving the request to display the comparison is in response to displaying a matching record alert via the user interface, wherein displaying the matching alert via the user interface comprises displaying an indicator whether any users previously responded to the matching record alert, and wherein receiving the request to display the comparison is based on a schedule for receiving the plurality of records from an on-demand system.

5. A non-transitory machine-readable medium storing one or more sequences of instructions for cleaning data in a customer relationship management system, which instructions, when executed by one or more processors, cause the one or more processors to:
receive a plurality of records;
compare the plurality of records to stored records in a database of a customer relationship management system, the plurality of records being stored in a datastore that is independent of the database of the customer relationship management system;
identify a record from the plurality of records based on the identified record having content in a first data field that matches content in a corresponding first data field in a stored record in the database of the customer relationship management system, the identified record further comprising content in a second data field that differs from content in a corresponding second data field in the stored record, the first and second fields of the identified record being different; and
update the content in the second data field in the stored record using the content in the second data field in the identified record in response to a determination to update the content in the second data field in the stored record using the content in the second data field in the identified record, the determination being made in response to either a user request or automatically based on a previously selected blank auto-fill default.

6. The non-transitory machine-readable medium of claim 5, wherein identifying the record is based on a business entity associated with the stored record and the identified record, and wherein the identified record is associated with at least one of a contact, a lead, an opportunity, and an account.

7. The non-transitory machine-readable medium of claim 5, wherein the receipt of the selection to update the content in the corresponding second data field in the stored record using the content in the second data field in the identified record is based on displaying a comparison of the identified record and the stored record via a user interface and receiving a selection to update the content in the corresponding second data field in the stored record using the content in the second data in the identified record via the user interface in response to displaying the comparison.

8. The non-transitory machine-readable medium of claim 7, wherein displaying the comparison is further based on receiving a request to display the comparison via the user interface, and wherein receiving the request to display the comparison is in response to displaying a matching record alert via the user interface, wherein displaying the matching alert via the user interface comprises displaying an indicator whether any users previously responded to the matching record alert, and wherein receiving the request to display the comparison is based on a schedule for receiving the plurality of records from an on-demand system.

9. A method for cleaning data in a customer relationship management system, the method comprising:
receiving a plurality of records;
comparing the plurality of records to stored records in a database of a customer relationship management system, the plurality of records being stored in a datastore that is independent of the database of the customer relationship management system;
identifying a record from the plurality of records based on the identified record having content in a first data field that matches content in a corresponding first data field in a stored record in the database of the customer relationship management system, the identified record further comprising content in a second data field that differs from content in a corresponding second data field in the stored record, the first and second fields of the identified record being different; and updating the content in the second data field in the stored record using the content in the second data field in the identified record in response to a determination to update the content in the second data field in the stored record using the content in the second data field in the identified record, the determination being made in response to either a user request or automatically based on a previously selected blank auto-fill default.

10. The method of claim 9, wherein identifying the record is based on a business entity associated with the stored record and the identified record, and wherein the identified record is associated with at least one of a contact, a lead, an opportunity, and an account.

11. The method of claim 9, wherein the receipt of the selection to update the content in the corresponding second data field in the stored record using the content in the second data field in the identified record is based on displaying a comparison of the identified record and the stored record via a user interface and receiving a selection to update the content in the corresponding second data field in the stored record using the content in the second data in the identified record via the user interface in response to displaying the comparison.

12. The method of claim 11, wherein displaying the comparison is further based on receiving a request to display the comparison via the user interface, and wherein receiving the request to display the comparison is in response to displaying a matching record alert via the user interface, wherein displaying the matching alert via the user interface comprises displaying an indicator whether any users previously responded to the matching record alert, and wherein receiving the request to display the comparison is based on a schedule for receiving the plurality of records from an on-demand system.

13. A system for cleaning data in a customer relationship management system, the system comprising:
 a processor-based application, which when executed on a computer, will cause the processor to:
  receive a plurality of records;
  compare the plurality of records to stored records in a database of a customer relationship management system, the plurality of records being stored in a datastore that is independent of the database of the customer relationship management system;
  identify a record from the plurality of records based on the identified record having content in a first data field that matches content in a corresponding first data field in a stored record in the database of the customer relationship management system, the identified record further comprising content in a second data field that differs from content in a corresponding second data field in the stored record, the first and second fields of the identified record being different; and
  update the content in the second data field in the stored record using the content in the second data field in the identified record in response to a determination to update the content in the second data field in the stored record using the content in the second data field in the identified record, the determination being made in response to either a user request or automatically based on a previously selected blank auto-fill default.

14. The system of claim 13, wherein identifying the record is based on a business entity associated with the stored record and the identified record, and wherein the identified record is associated with at least one of a contact, a lead, an opportunity, and an account.

15. The system of claim 13, wherein the receipt of the selection to update the content in the corresponding second data field in the stored record using the content in the second data field in the identified record is based on displaying a comparison of the identified record and the stored record via a user interface and receiving a selection to update the content in the corresponding second data field in the stored record using the content in the second data in the identified record via the user interface in response to displaying the comparison.

16. The system of claim 15, wherein displaying the comparison is further based on receiving a request to display the comparison via the user interface, and wherein receiving the request to display the comparison is in response to displaying a matching record alert via the user interface, wherein displaying the matching alert via the user interface comprises displaying an indicator whether any users previously responded to the matching record alert, and wherein receiving the request to display the comparison is based on a schedule for receiving the plurality of records from an on-demand system.

* * * * *